Sept. 24, 1957    R. TYLER    2,807,140
HYDRAULIC TRANSMISSION

Filed April 16, 1956    7 Sheets-Sheet 1

FIG. 1

INVENTOR
RANSOM TYLER
BY *Wesley P. Merrill*
ATTORNEY

Fig. 2

Sept. 24, 1957  R. TYLER  2,807,140
HYDRAULIC TRANSMISSION

Filed April 16, 1956  7 Sheets-Sheet 4

FIG. 4

INVENTOR
RANSOM TYLER
BY *Wesley P. Merrill*
ATTORNEY

INVENTOR
RANSOM TYLER
BY
ATTORNEY

Sept. 24, 1957 R. TYLER 2,807,140
HYDRAULIC TRANSMISSION
Filed April 16, 1956 7 Sheets-Sheet 7

FIG. 10

INVENTOR
RANSOM TYLER
BY
ATTORNEY

United States Patent Office 2,807,140
Patented Sept. 24, 1957

2,807,140

HYDRAULIC TRANSMISSION

Ransom Tyler, Greenfield, Wis., assignor to The Oilgear Company, Milwaukee, Wis., a corporation of Wisconsin Application April 16, 1956, Serial No. 578,493

12 Claims. (Cl. 60—53)

This invention relates to hydraulic transmissions of the type in which the speed of a motor or other actuator is accurately controlled by metering the flow of liquid through a part of its circuit, such as the transmission shown in Patent No. 2,768,500 which issued on application Serial No. 509,713 of which this application is a continuation in part. In that transmission, a hydraulic motor is energized by liquid supplied thereto by a pump, its speed in one direction is determined by the displacement of the pump, and its speed in the opposite direction is accurately controlled by accurately metering the outflow from the motor.

The present invention has as its object to provide a transmission in which the speed of an actuator is held exactly at a desired rate by supplying liquid to the actuator at an accurately controlled rate.

It is common practice to operate a hydraulic motor with liquid supplied thereto from a variable displacement pump and to regulate the speed of the motor by varying the displacement of the pump. Power pumps have as an inherent characteristic thereof a certain amount of internal leakage or slip which varies in response to variations in pressure and variations in the viscosity of the liquid due to variations in temperature, and the variations in slip cause corresponding variations in the discharge rate of the pump with resultant variations in the speed of the motor.

However, the output speeds of the present transmissions remain near enough to the desired speeds to be satisfactory in the large majority of cases. When a more nearly constant speed is required, the pump has been provided with means to compensate for variations in pressure and temperature. Such compensating means reduce the variations in the pump discharge rate but no such compensating means has been produced which will maintain the pump discharge rate constant at any given adjustment of the pump.

According to the present invention, liquid for energizing an actuator is supplied by a booster pump having a liquid-tight case and a displacement varying member which is continuously urged toward its zero displacement position by a substantially constant force and is movable toward its maximum displacement position by a hydraulic servo-motor, a measuring pump has its outlet connected solely to the inlet of the booster pump, to the interior of the liquid-tight case and to the inlet of the servo-motor, and both pumps are driven in unison to cause the measuring pump to supercharge the booster pump at a low pressure and the servo-motor to increase the displacement of the booster pump until it is discharging liquid at the same rate as the measuring pump and at the pressure necessary to operate the actuator. The drop in pressure across the booster pump causes liquid to leak therefrom into the case but the leakage liquid flows back into the booster pump so that the discharge rate of the booster pump is exactly equal to the discharge rate of the measuring pump.

The invention is exemplified by the transmissions shown schematically in the accompanying drawings in which the views are as follows.

Figure 1:
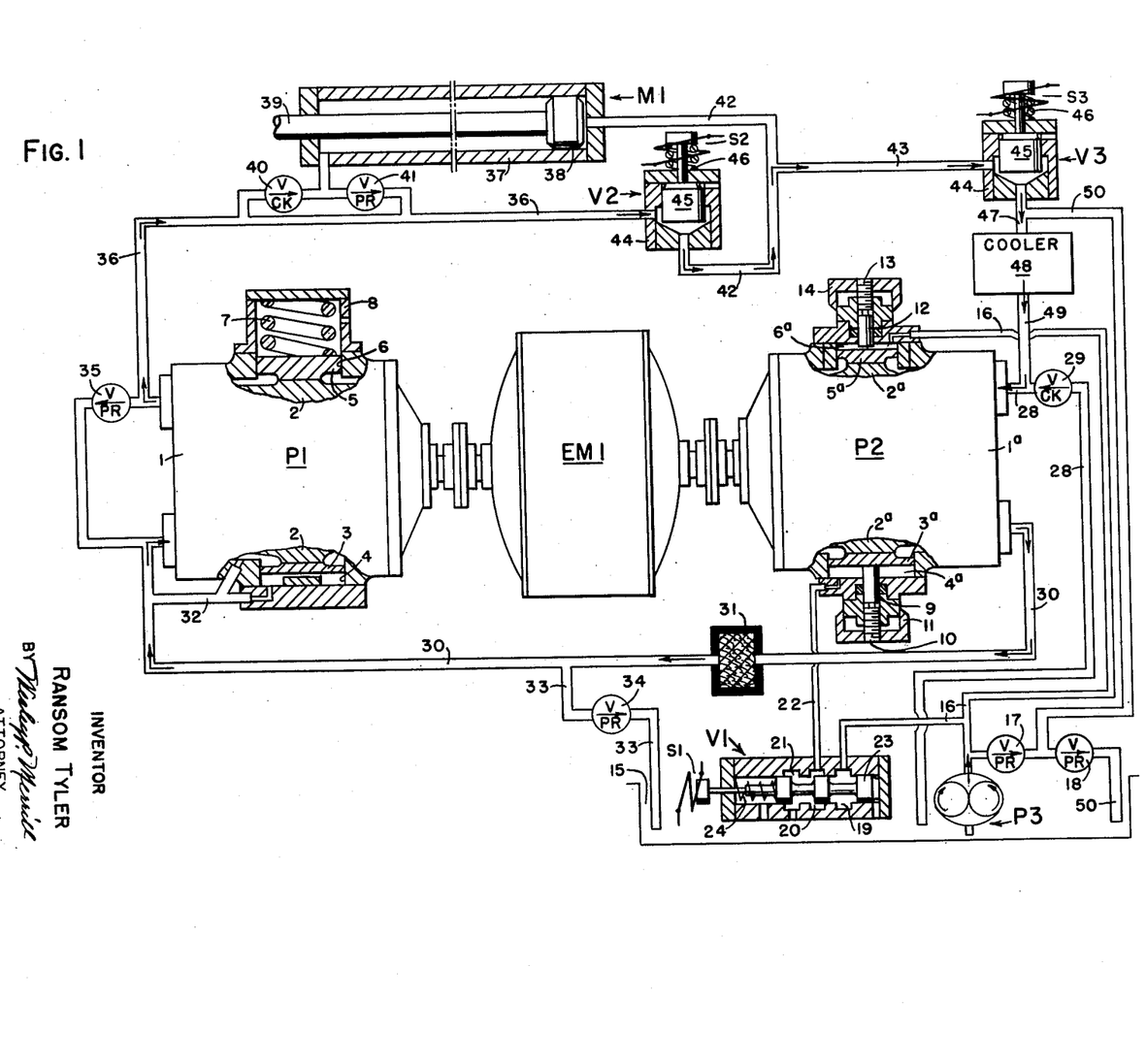
Fig. 1 is a diagram of the hydraulic circuit of a transmission in which the invention is embodied.

Referring first to Fig. 1, the transmission shown therein includes a hydraulic motor M1 which had been shown as being of the reciprocating type but it may be of the rotary type, a booster pump P1 for energizing motor M1, a measuring pump P2 which supercharges pump P1, and an electric motor EM1 which drives pumps P1 and P2 in unison and preferably is of the synchronous type so that its speed will not be affected by variations in the load on motor M1.

Pump P1 has its mechanism arranged within a case 1 which is made liquid tight. That mechanism includes a displacement varying member or slide block 2 which is slideably fitted in case 1, a piston 3 which engages one side of slide block 2 and is fitted in a cylinder 4 arranged in one side of case 1, and a piston 5 which engages the other side of slide block 2 and is fitted in a cylinder 6 arranged in the other side of case 1.

Pump P2 is similar to pump P1 and has its mechanism arranged within a case 1ᵃ the interior of which is connected to drain. The mechanism of pump P2 includes a displacement varying member or slide block 2ᵃ which is slideably fitted in case 1ᵃ, a piston 3ᵃ which engages one side of slide block 2ᵃ and is fitted in a cylinder 4ᵃ arranged in one side of case 1ᵃ, and a piston 5ᵃ which engages the other side of slide block 2ᵃ and is fitted in a cylinder 6ᵃ arranged in the other side of case 1ᵃ.

Pumps P1 and P2 are of a well-known type which have been in extensive commercial use for many years. Therefore, the pumps have not been illustrated in detail and it is deemed sufficient to state herein that when driven each pump will deliver liquid at a rate determined by the distance the slide block thereof is offset from its neutral or zero displacement position.

Slide block 2 of pump P1 is continuously urged toward its zero displacement position by a constant force such as by a servomotor supplied with liquid at a constant low pressure or, as shown, by a spring 7 which engages piston 6 and is arranged within a vented cap 8 fastened to case 1. Slide block 2 will be moved toward its maximum displacement position by piston 3 when liquid is supplied to cylinder 4 at a pressure high enough to enable piston 3 to move slide block 2 against the resistance of spring 7. The area of piston 3 and the strength of spring 7 are such that only a low pressure, such as 80 p. s. i., is needed to enable piston 3 to move slide block 2.

Slide block 2ª of pump P2 is continuously urged toward a minimum displacement position by piston 5ª when liquid is supplied to cylinder 6ª at a constant low pressure. The minimum displacement position of slide block 2ª is determined by the position of a stop 9 which engages piston 3ª and extends through the head of cylinder 4ª into engagement with an adjusting screw 10 having graduations (not shown) on its head or knob 11.

Slide block 2ª will be moved toward a maximum displacement position by piston 3ª when liquid at the same constant low pressure is supplied to cylinder 4ª the cross-sectional area of which is approximately twice that of cylinder 6ª. The maximum displacement position of slide block 2ª is determined by the position of a stop 12 which engages piston 5ª and extends through the head of cylinder 6ª into engagement with an adjusting screw 13 having graduations (not shown) on its head or knob 14.

Liquid for energizing servomotors 3ª—4ª and 5ª—6ª is supplied by an auxiliary pump P3 which draws liquid from a reservoir 15 and discharges it into a branched supply channel 16 one branch of which is connected to cylinder 6ª. Pump P3 discharges liquid at a rate in excess of requirements and the excess liquid is exhausted through a relief valve 17 and a back pressure valve 18 which have sufficient resistance to enable pump P3 to maintain a constant low pressure in channel 16 and in cylinder 6ª. Reservoir 15 and pump P3 have been shown separate from pump P2 but in practice reservoir 15 constitutes a base upon which pump P2 is mounted and pump P3 is driven in unison with pump P2 and is arranged in its casing 1ª.

Flow of liquid to and from servomotor 3ª—4ª is under the control of a pilot valve V1 having three annular grooves or ports 19, 20, and 21 formed in its body. Port 19 has a branch of supply channel 16 connected thereto, port 20 is connected to cylinder 4ª by a channel 22, and port 21 discharges into reservoir 15. Communication between those ports is controlled by a valve plunger 23 which is normally held in the position shown by a spring 24 and is movable into another position by a solenoid S1.

With valve plunger 23 in the position shown, cylinder 4ª is open to exhaust through channel 22 and valve V1 so that the pressure in cylinder 6ª will enable piston 5ª to hold piston 3ª against stop 9 and thereby keep pump P2 at a minimum displacement. When solenoid S1 is energized and moves the valve plunger 23 to its other position, liquid from supply channel 16 will flow through valve V1 and channel 22 into cylinder 4ª and cause piston 3ª to move slide block 2ª toward its maximum displacement position until further movement thereof is stopped by piston 5ª engaging stop 12.

Pump P2 has its inlet connected to reservoir 15 through a channel 28 having connected therein a check valve 29 which permits pump P2 to draw liquid from reservoir 15 but prevents discharge of liquid through channel 28 into reservoir 15. The outlet of pump P2 is connected to the inlet of pump P1 by a channel 30 which preferably has a filter 31 arranged therein. Channel 30 is also connected by a channel 32 to the interior of pump case 1 and servomotor cylinder 4 and it also communicates with reservoir 15 through a channel 33 having a low pressure relief valve 34 connected therein. Relief valve 34 is adjusted to open at a low pressure which is only a little higher than the pressure required to enable piston 3 to shift slide block 2.

The pressure which can be created by pump P1 is limited by a high pressure relief or safety valve 35, as is customary, which has been shown connected between channel 30 and a channel 36 connected to the outlet of pump P1 but in practice valve 35 is arranged inside the pump.

The liquid discharged by pump P1 into channel 36 may either energize motor M1 or be by-passed around the motor which has been shown as including a stationary cylinder 37, a piston 38 which is fitted in cylinder 37, and a piston rod 39 which is fixed to piston 38 and extends through the left end of cylinder 37. As shown, channel 36 connects the outlet of pump P1 to the inlet of a by-pass valve V2 and is connected intermediate its ends to the rod end of motor M1 through a check valve 40 and a low pressure resistance valve 41. The outlet of valve V2 is connected to the head end of motor M1 by a channel 42 which is connected intermediate its ends to the inlet of a directional valve V3 by channel 43.

Valves V2 and V3 may be of any suitable type and in practice they are hydraulically operated under the control of pilot valves. But in order to simplify the drawing, valves V2 and V3 have been shown as normally open solenoid operated check valves. The two valves are alike and each includes a body 44, a plunger 45 which is fitted in body 44 and controls the flow of liquid therethrough, and a spring 46 which normally holds plunger 45 in its open position. Valves V2 and V3 are provided, respectively, with solenoids S2 and S3 which when energized will close the valves.

The liquid discharged by motor M1 preferably is cooled before being returned to pump P2. As shown, the outlet of valve V3 is connected by a channel 47 to the inlet of a cooler 48 the outlet of which is connected to the inlet of pump P2 by a channel 49 which has been shown connected to channel 28 at a point between check valve 29 and pump P2. Channel 47 communicates intermediate its ends with a channel 50 which discharges into reservoir 15 and has back pressure valve 18 connected therein and to which the outlet of relief valve 17 is connected.

OPERATION

Assuming that the transmission has been operated until the system is completely filled with liquid, that the pumps are running and that the parts are in the positions shown, the transmission will operate as follows:

Pump P2 will deliver liquid through channel 30 to pump P1 which will discharge it into channel 36. The first part of the liquid delivered to pump P2 will have flowed through channel 32 into cylinder 4 and caused piston 3 to move slide block 2 toward its maximum displacement position until pump P1 is discharging liquid as fast as but no faster than the liquid is supplied thereto by pump P2. The liquid discharged by pump P1 will flow through channel 36, valve V2, channels 42 and 43, valve V3, channel 47, cooler 48, and channels 49 and 28 into the inlet of pump P2.

When valve V3 is closed, the liquid discharged by pump P1 will flow through channel 36, valve V2 and channel 42 into the head end of motor M1 and cause piston 38 and rod 39 to move toward the left and piston 38 to eject liquid from cylinder 37 through resistance valve 41, channel 36, valve V2 and channel 42 into the head end of cylinder 37, thereby causing piston 38 and rod 39 to move toward the left at a rapid rate because the volume of liquid required to operate motor M1 is only equal to the displacement of rod 39. During this time, pump P2 draws its supply of liquid from reservoir 15 through channel 28 and check valve 29.

If it is desired to operate motor M1 at high speed, the plunger 23 of pilot valve V1 is shifted to its left hand position to direct liquid from pump P3 into cylinder 4ª and cause piston 3ª to increase the displacement of pump P2 to the maximum determined by the position of stop 12 as previously explained, thereby causing pump P2 to deliver liquid to pump P1 at a maximum rate. Some of the liquid delivered to pump P1 will flow through channel 32 into cylinder 4 and cause piston 3 to move slide block 2 toward its maximum displacement position until pump P1 is discharging liquid at the same rate that pump P2 is discharging liquid.

Reversal of motor M1 is effected by closing valve V2 and opening valve V3. Then the liquid discharged by pump P1 will flow through channel 36 and check valve 40 into cylinder 37 and cause piston 38 to move toward the right and to eject liquid from cylinder 37 through channels 42 and 43, valve V3, channel 47, cooler 48 and channels 49 and 28 into pump P2. Since liquid is ejected from motor M1 at a rate greater than the rate at which pump P2 is discharging liquid, the liquid in excess of the liquid required to supply pump P2 will be exhausted into reservoir 15 through channel 50 and the back pressure valve 18 therein will assure that sufficient liquid enters pump P2. If at this time pump P2 is at a maximum displacement, motor M1 will operate at a speed determined by the position of stop 12.

Pump P1 must create a pressure high enough to enable motor M1 to operate and that pressure will vary as the load on motor M1 varies. The pressure created by pump P1 will cause liquid to leak out of the pumping mechanism into case 1. Since case 1 is filled with liquid and a low pressure is maintained therein by pump P2, the first of the liquid leaking into case 1 will flow therefrom through channel 32 into cylinder 4 and cause piston 3 to move slide block 2 toward its maximum displacement position until all of the liquid leaking into case 1 can flow therefrom through channels 32 and 30 into the inlet of pump P1. Consequently, pump P1 must deliver into channel 36 all of the liquid delivered to it by pump P2.

Since the pressure created by pump P2 is determined by the resistance of spring 7, that pressure will be low and constant, the leakage from pump P2 will be very small and will remain constant so that at any given adjustment pump P2 will discharge liquid at a constant rate.

Therefore, pump P1 will discharge liquid at a rate which is exactly the same as the discharge rate of pump P2 and which remains constant at any given adjustment of pump P2. Consequently, the speed of motor M1 will remain constant at any given adjustment of valves V1, V2 and V3.

Fig. 2

Figure 2:
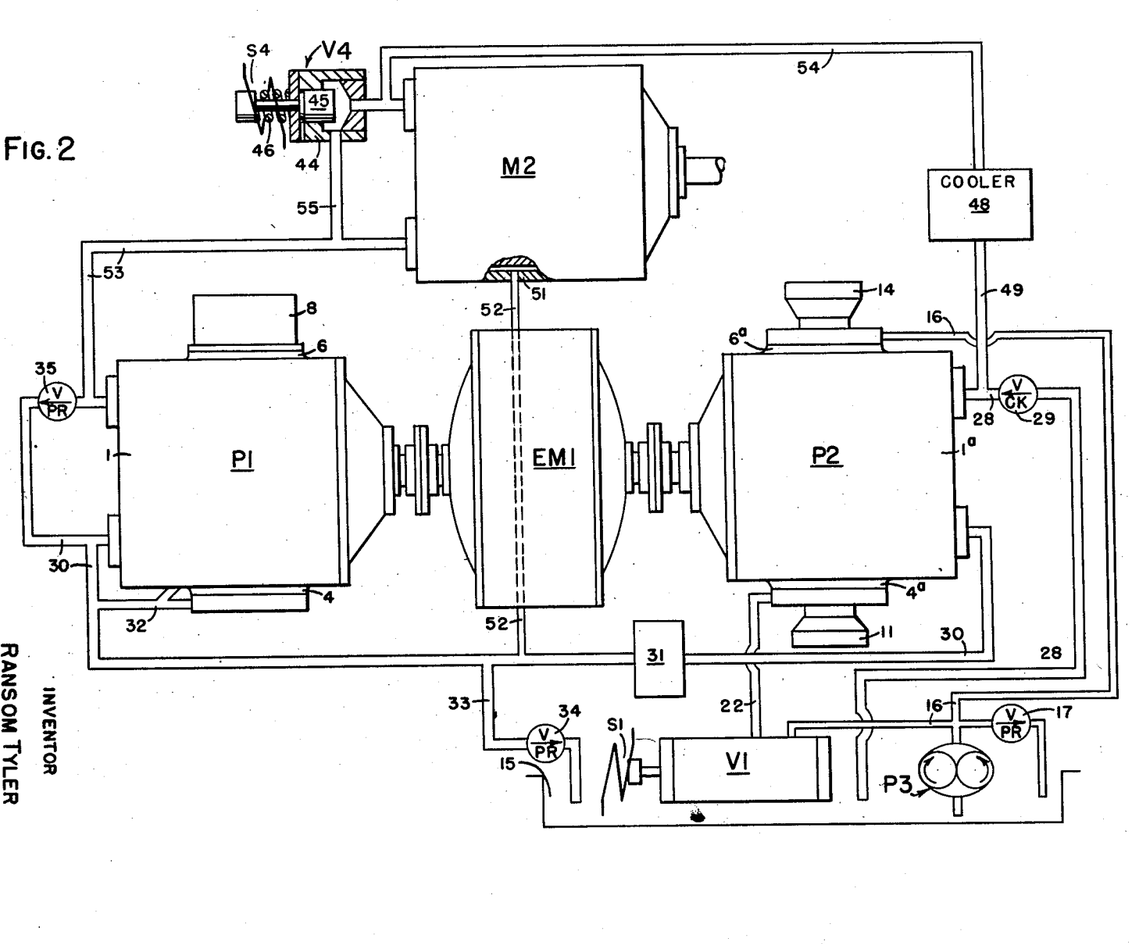
Fig. 2 is a diagram of the hydraulic circuit of a transmission which is similar to the transmission shown in Fig. 1 but which differs primarily therefrom in that it includes a rotary motor instead of a reciprocating motor.

The transmission shown in this figure differs primarily from the transmission shown in Fig. 1 in that it has a rotary hydraulic motor instead of a reciprocating hydraulic motor. The booster and the measuring pumps, the parts associated therewith and the electric motor for driving the pumps are the same as in Fig. 1 and have been indicated by the same reference numerals. Therefore, further description thereof is deemed unnecessary.

As shown, the transmission includes a rotary hydraulic motor M2 having its mechanism arranged within a liquid-tight case 51 the interior of which is connected to the inlet of pump P1 such as by connecting case 51 by a channel 52 to channel 30 so that liquid leaking out of the motor mechanism into case 51 can flow to the inlet of pump P1 and case 51 is kept filled with liquid at the low pressure created by pump P2. Motor M2 has its inlet connected to the outlet of pump P1 by a channel 53 and its outlet connected by a channel 54 to a cooler 48 which is connected to the inlet of pump P2 through channels 49 and 28 as in Fig. 1.

In order to bypass the liquid discharged by pump P1 around motor M2 when desired, channel 53 is connected by a channel 55 to the inlet of a bypass valve V4 which has been shown as being normally open and as having its outlet connected to channel 54. Valve V4 is adapted to be closed by a solenoid S4 but is otherwise identical to bypass valve V2. Therefore, like parts of the two valves have been indicated by like reference numerals and a description of valve V4 is deemed unnecessary.

The arrangement is such that, when valve V4 is open, the liquid discharged by pump P1 will flow through channels 53 and 55, valve V4, channel 54, cooler 48 and channels 49 and 28 to the inlet of pump P2. When valve V4 is closed, the liquid discharged by pump P1 will flow through channel 53 into motor M2 to energize it and the liquid discharged by motor M2 will flow through channel 54, cooler 48, and channels 49 and 28 into pump P2.

When the transmission is functioning, pump P1 must create a pressure which is high enough to enable motor M2 to drive its load and which will vary in accordance with variations in the load. That pressure will cause liquid to leak out of the mechanism of motor M2 and pump P1 into the cases thereof.

The leakage of pump P1 will be added to the liquid supplied to pump P1 by pump P2 as previously explained. The leakage of motor M2 will flow through channels 52 and 30 to the inlet of pump P1 but, since pump P1 is being supercharged by pump P2, the leakage liquid cannot at first enter the pumping mechanism but enough of the leakage liquid will enter cylinder 4 to cause piston 3 (Fig. 1) to shift slide block 2 until all of the leakage of motor M2 can enter the inlet of pump P1. The volume of liquid discharged by pump P1 is thus equal to the volume of liquid discharged by pump P2 plus the leakage of motor M2. Consequently, the speed of motor M2 is determined by the adjustment of pump P2 and it will remain constant at any given adjustment of pump P2 regardless of variations in load on motor M2.

Figs. 3–10

The pumping unit shown in these figures functions in the same way as the pumping unit shown in Fig. 1 but it differs primarily therefrom in that the booster pump and the measuring pump are both arranged within a liquid-tight case. Also, the measuring pump is supercharged by a low pressure pump shown as being a gear pump.

This arrangement provides a very compact unit which is primarily intended to be made in small sizes and to be used as a feed pump for hydraulically operated machine tools such as lathes, milling machines, and the like but it may be made in larger sizes in which case the measuring pump would be supercharged by an auxiliary pump of larger capacity such as a variable displacement vane pump which will automatically reduce its displacement after it has created a predetermined low pressure.

Figure 3:
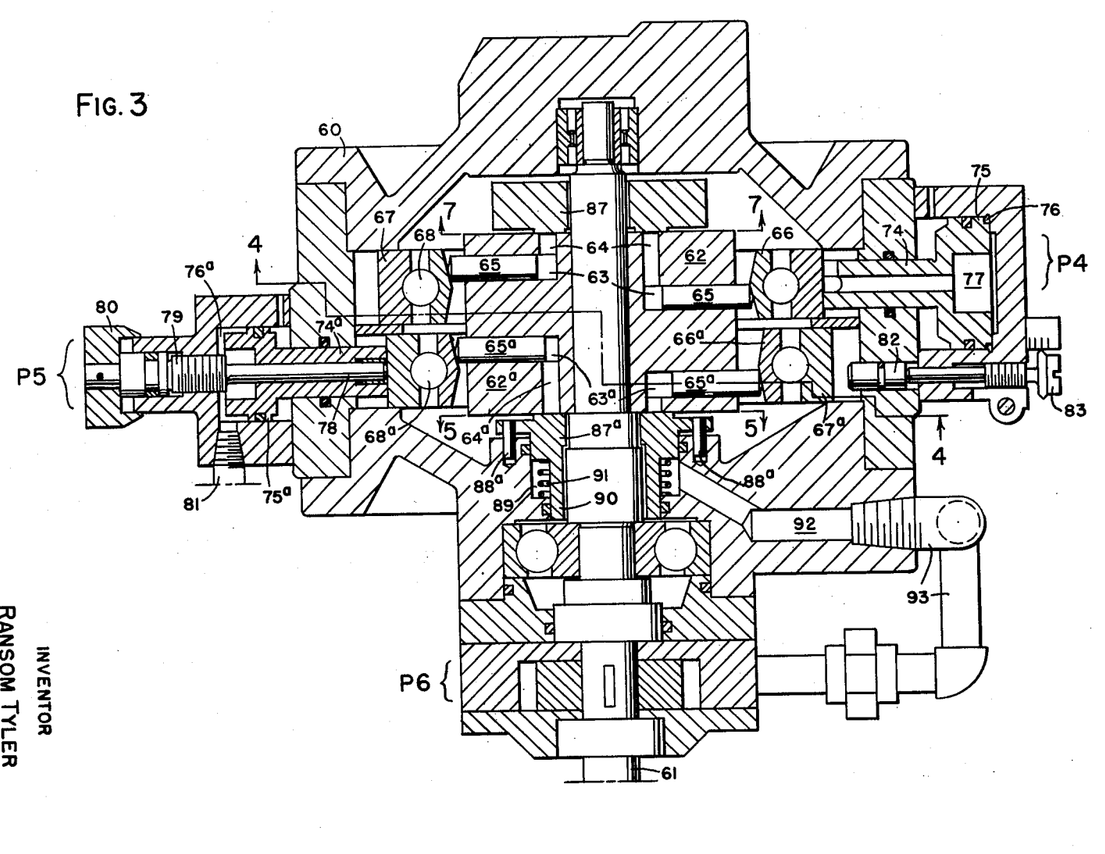
Fig. 3 is a central sectional plan view taken through a pumping unit having a measuring pump and a booster pump arranged within a liquid-tight case, the view being taken on the line 3—3 of Fig. 4 but with certain parts shown in full.

The pumping unit includes a booster pump P4 and a measuring pump P5 which are arranged within a liquid-tight case 60 and driven in unison by a shaft 61 journaled in case 60, and an auxiliary pump P6 which is outside of case 60 and has been shown as being carried by case 60 and driven by shaft 61 but it may be arranged in any desired location and driven in any suitable manner.

Pump P4 includes a cylinder barrel 62 which is keyed or splined on shaft 61 and has formed therein a plurality of radial cylinders 63 and a passage 64 leading from each cylinder 63 through the adjacent end of the cylinder barrel. A piston 65 is fitted in each cylinder 63 and has its outer end in contact with the beveled inner face of a thrust ring 66 which is rotatably supported in a displacement varying member or slide block 67 by a ball bearing 68. Slide block 67 is shiftable transversely of shaft 61 to vary pump displacement and is restrained from movement in any other direction. Slide block 67 has been shown in Fig. 3 as being restrained from vertical movement by slide plates 69 but in practice it is mounted between roller bearings.

Pump P5 is the same as but opposite hand to pump P4 as thus far described and like parts have been indicated by like reference numerals with the exponent "a" added to the reference numerals applied to pump P5 so that a detailed description thereof is unnecessary. In practice, cylinder barrels 62 and 62$^a$ are made integral for the sake of convenience and economy in manufacture and are so shown but they are functionally independent of each other and may be individual units and be separately keyed or splined to shaft 61.

Figure 4:
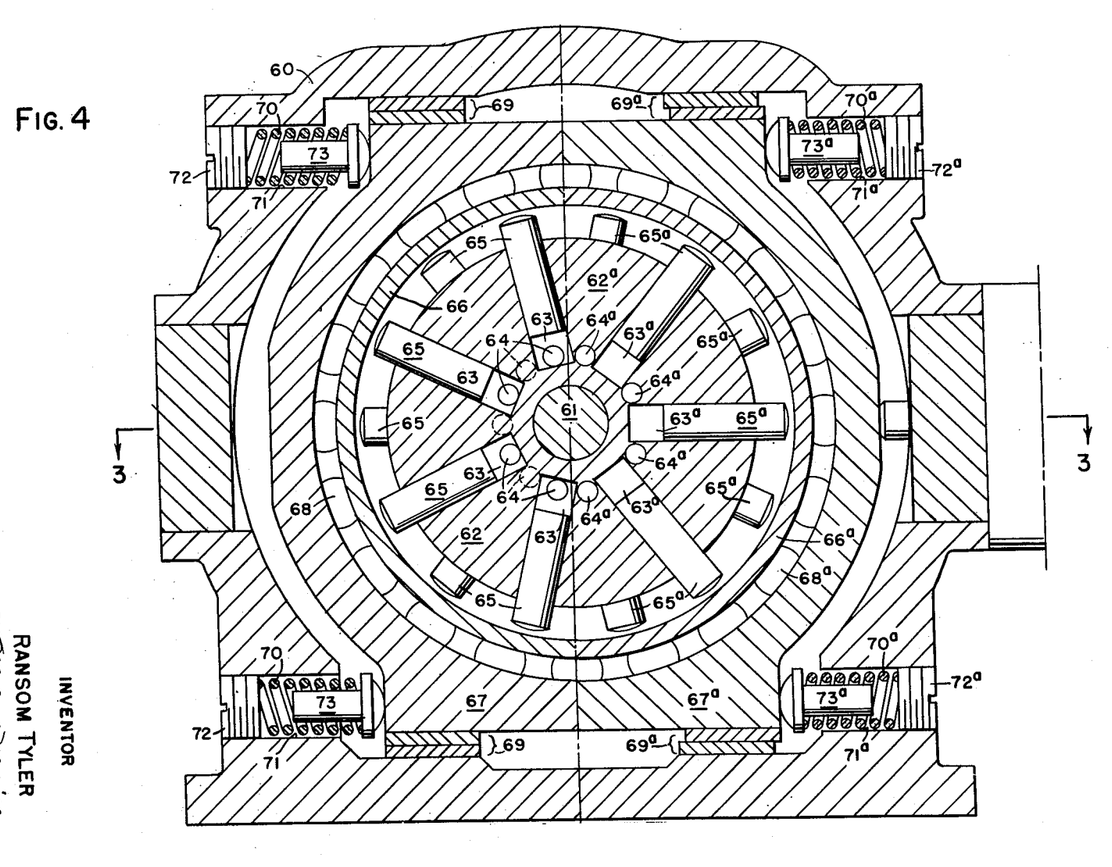
Fig. 4 is a transverse vertical section taken on the irregular line 4—4 of Fig. 3 but drawn to a larger scale.

Displacement varying members or slide blocks 67 and 67a are each urged in a direction to reduce pump displacement by a substantially constant force which may be applied either mechanically or hydraulically. As shown in Fig. 4, slide block 67 is urged toward the right by two springs 70 arranged in two bores 71 formed in case 60. Each spring 70 is arranged between a plug 72, which closes the end of bore 71, and a contact member 73 which engages slide block 67. Likewise, slide block 67a is urged toward the left by two springs 70a arranged in two bores 71a formed in case 60. Each spring 70a is arranged between a plug 72a, which closes the end of bore 71a, and a contact member 73a which engages slide block 67a.

Each of slide blocks 67 and 67a is prevented from moving beyond a predetermined minimum or its zero displacement position by a suitable stop and it is adapted to be moved toward its maximum displacement position by a hydraulic servo-motor. As shown in Fig. 3, slide block 67 is engaged by a piston rod 74 which extends through the wall of case 60 and is formed integral with a piston 75 fitted in a cylinder 76 which is fixed to case 60. Rod 74 and piston 75 are so proportioned as to prevent slide block 67 from being moved toward the right beyond its zero displacement position.

The outer end of cylinder 76 communicates with the interior of case 60 through a passage 77 which extends through piston 75 and rod 74 so that, when case 60 is completely filled with liquid and liquid is supplied thereto at a predetermined low pressure, liquid will flow therefrom through passage 77 into cylinder 76 and cause piston 75 and rod 74 to move slide block 67 toward the left to increase the displacement of pump P4. It has previously been stated that case 60 is liquid tight and some of the sealing elements have been shown but others have been omitted to avoid complicating the drawing.

Movement of slide block 67a toward the right is effected by a servo-motor comprising a cylinder 76a which is fixed to case 60, a piston 75a which is fitted in a cylinder 76a and has a rod 74a which extends through the wall of case 60 and is adapted to engage slide block 67a.

The distance that springs 70a can move slide block 67a toward the left is limited by a stop rod 78 which extends through piston rod 74a and is integral with a screw 79 which is threaded in the end wall of cylinder 76a and has fixed on its outer end an adjusting knob 80 for rotating it to adjust the position of stop rod 78. When springs 70a are holding slide block 67a against stop rod 78 as shown in Fig. 3, the displacement of pump P5 will be at a predetermined minimum as determined by the position of rod 78.

Liquid for energizing servo-motor 74a—76a is supplied thereto through a channel 81 from any suitable source such as auxiliary pump P6. When liquid under pressure is supplied to cylinder 76a, piston 75a will move slide block 67a toward the right until it engages a stop 82 which is slideable in the wall of case 60 and engages an adjusting screw 83 shown as being threaded in and extending through the side wall of cylinder 76. With slide block 67a against stop 82, the displacement of pump P5 will be at the maximum displacement determined by the position of screw 83.

Figure 5:
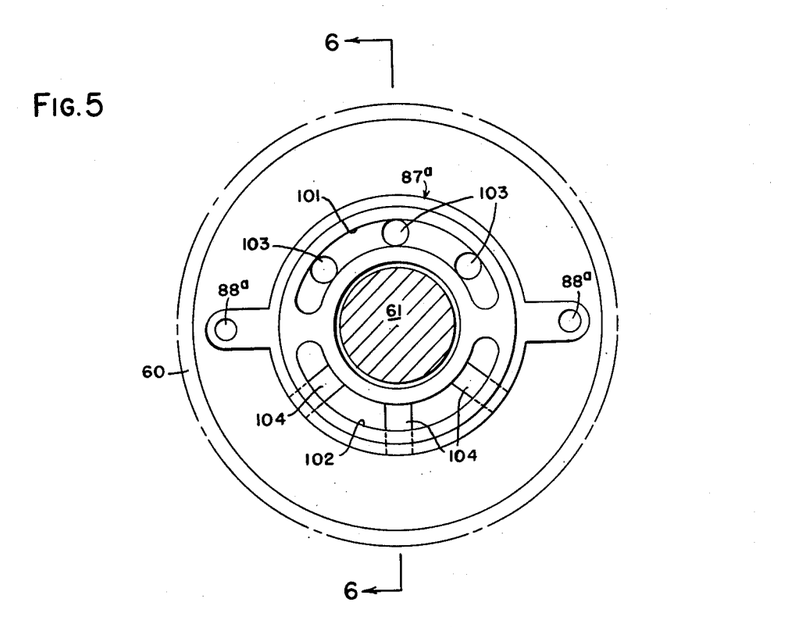
Fig. 5 is a view showing the face of a valve which controls the flow of liquid to and from the cylinders of the measuring pump, the view being taken on the line 5—5 of Fig. 3 but drawn to a larger scale.

Flow of liquid into and out of the cylinders 63 of pump P4 is controlled by a flat faced valve 87 which encircles shaft 61 and engages the flat end of cylinder barrel 62. Flow of liquid into and out of the cylinders 63a of pump P5 is controlled by a flat faced valve 87a which encircles shaft 61 and engages the flat end of cylinder barrel 62a. Rotation of valve 87 is prevented by pins 88 (Fig. 7) and rotation of valve 87a is prevented by pins 88a (Figs. 3 and 5). The pins ordinarily are closely fitted in case 60 but are loosely fitted in the valves to permit the valves to adjust themselves to the ends of the cylinder barrel.

Valve 87a is annular and is loosely fitted in a bore 89 which is formed in the end wall of case 60 and reduced in diameter near its outer end. An annular sleeve 90 is formed integral with valve 87a and is loosely fitted in the reduced portion of bore 89. Leakage of liquid into or out of bore 89 is prevented by suitable sealing rings arranged in the walls of bore 89 near the ends thereof.

Bore 89 has a spring 91 arranged therein around sleeve 90 to urge valve 87a against the end of cylinder barrel 62a. The portion of bore 89 containing spring 91 communicates with a passage 92 which is formed in case 60 and is connected by a channel 93 to pump P6. When pump P6 is running, the pressure created thereby will extend into bore 89 and assist spring 91 in holding valve 87a against slide block 62a.

Figure 10:
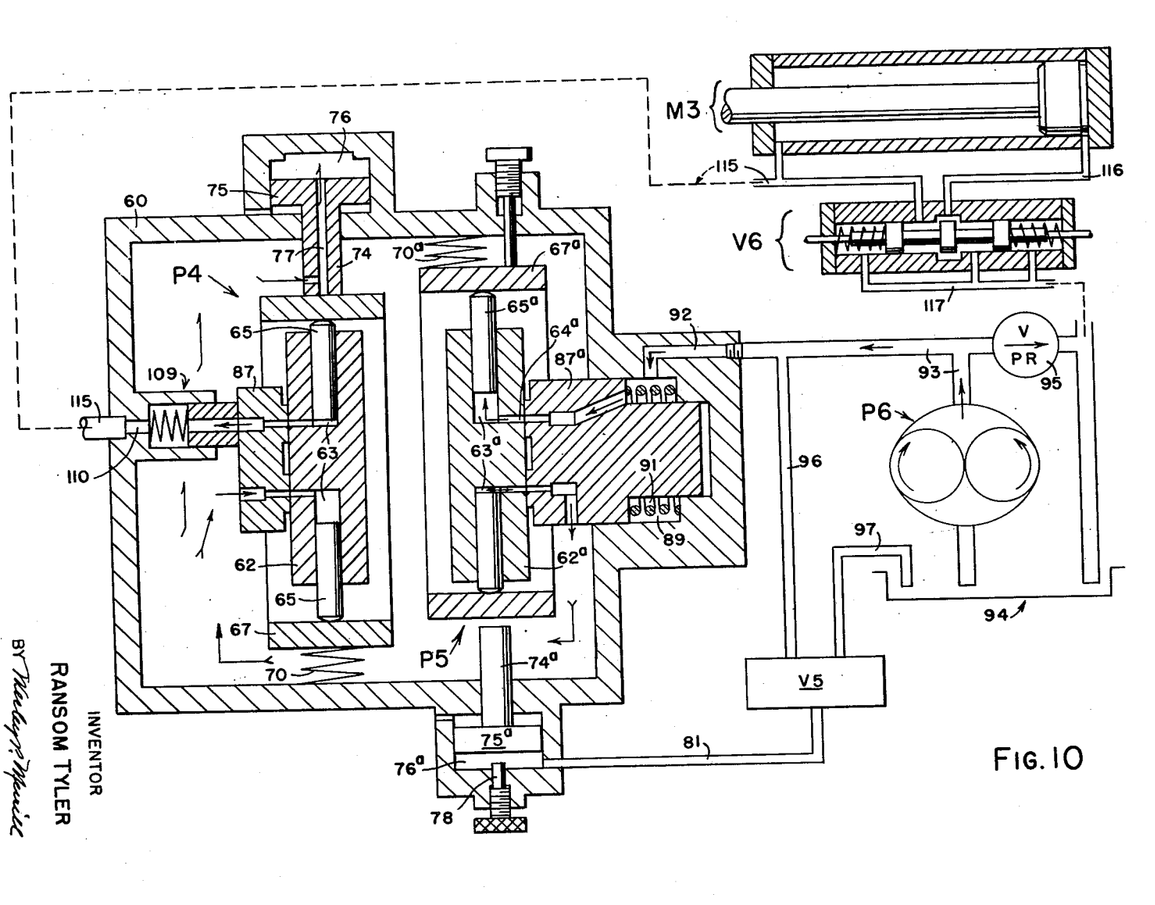
Fig. 10 is a diagram illustrating the hydraulic circuit of the pumping unit of Figs. 3–9 and also illustrates one way of connecting the unit to a hydraulic motor.

Pump P6 draws liquid from a reservoir 94 (Fig. 10) and discharges it into channel 93 at a rate in excess of requirements and the excess liquid is exhausted through a relief valve 95 which enables pump P6 to maintain a constant low pressure in channel 93 and in bore 89. Liquid from pump P6 may be employed to effect operation of the displacement varying mechanism of pump P5. Fig. 10 shows channel 93 connected by channel 96 to a pilot valve V5 which may be substantially the same as valve V1 (Fig. 1) and which has channel 81 and an exhaust channel 97 connected thereto.

Figure 6:
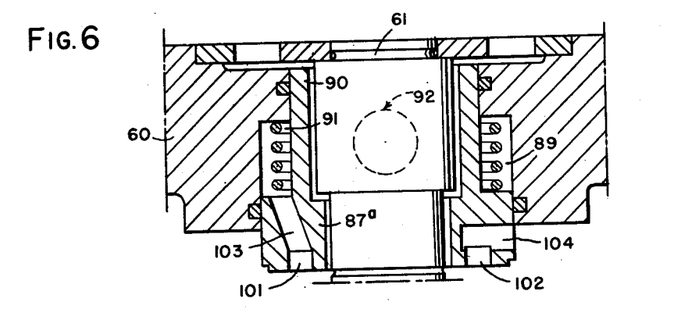
Fig. 6 is a section through the valve of Fig. 5 and portions of parts adjacent thereto, the plane of the view being indicated by the line 6—6 of Fig. 5.

As shown in Figs. 5 and 6, valve 87a has formed in the face thereof which engages cylinder barrel 62a two arcuate ports 101 and 102 with which each of passages 64a communicates alternately during rotation of cylinder barrel 62a. The adjacent ends of the two ports are spaced apart a distance equal to and slightly greater than the diameter of a passage 64a to prevent communication between the two ports as a passage 64a passes from one port to the other.

Port 101, which is the inlet port, communicates with a plurality of holes 103 which extend therefrom through valve 87a into communication with that part of bore 89 which contains spring 91 and which is supplied with liquid by pump P6 as explained above. Port 102, which is the discharge port, communicates with a plurality of holes 104 which extend radially outward through the periphery of valve 87a.

The arrangement is such that rotation of shaft 61 will cause pump P6 to be driven and cylinder barrel 62a to be rotated and effect reciprocation of pistons 65a. The cylinders 63a containing outward moving pistons will be supplied with liquid through the passages 64a connected thereto, valve port 101, holes 103, bore 89, passage 92 and channel 93 from pump P6 so that pump P5 is supercharged at a low pressure as determined by the resistance of relief valve 95. The inward moving pistons 65a will eject liquid from their cylinders 63a through the passages 64a connected thereto, valve port 102, and holes 104 into case 60 and will create therein a pressure which is low but is high enough to enable servo-motor 74—75 (Fig. 3) to move slide block 67 against resistance of springs 70 (Fig. 4), the flow of liquid from pump P6 through pump P5 into case 60 being indicated by arrows in Fig. 10.

Figure 7:
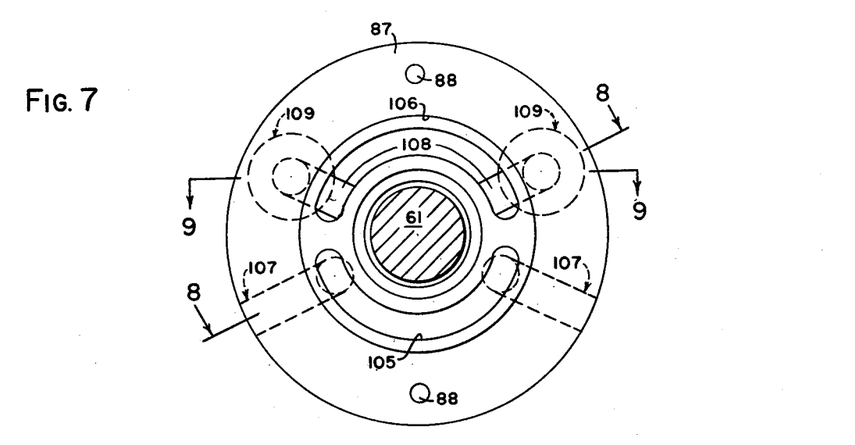
Fig. 7 is a face view of the valve which controls the flow of liquid to and from the cylinders of the booster pump, the view being taken on the line 7—7 of Fig. 3 but drawn to the same scale as Fig. 5.
Figures 8, 9:
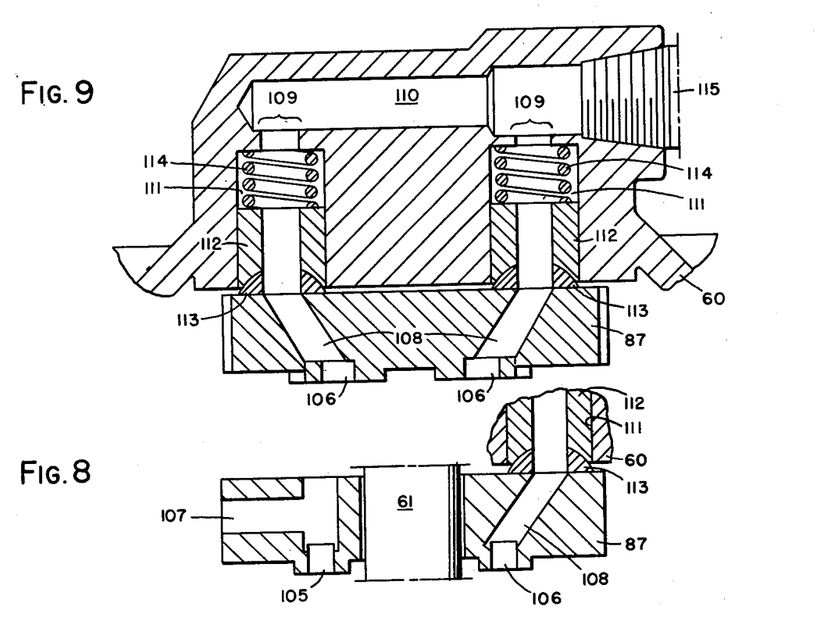
Fig. 8 is a sectional view taken on the line 8—8 of Fig. 7.
Fig. 9 is a sectional view taken through the valve and through certain adjacent parts on the line 9—9 of Fig. 7.

As shown in Figs. 7–9, valve 87 has formed in the face thereof which engages cylinder barrel 62 two arcuate ports 105 and 106 with which each of passages 64 communicates alternately during rotation of cylinder barrel 62. The adjacent ends of the two ports are spaced apart a distance equal to or slightly greater than the diameter of a passage 64 to prevent communication between the two ports as a passage 64 passes from one port to the other.

Port 105, which is the inlet port, communicates with one or more holes 107 which extend therefrom through valve 87 into communication with the interior of case 60. Port 106, which is the discharge port, communicates with two holes 108 which extend through valve 87 and communicate through two identical hold-up motors 109 with a passage 110 which is formed in the end wall of case 60.

Each hold-up motor 109 includes a cylinder 111 which is formed in the end wall of case 60 concentric with the outer end of one of the holes 108, a tubular piston 112 which is fitted in cylinder 111, an annular sealing member 113 which is arranged between piston 112 and valve 87 and extends around the end of hole 108, and a spring 114 which is arranged in cylinder 111 and urges piston 112 against member 113 and member 113 against valve 87. The mating surfaces of member 113 and valve 87 are made flat and smooth and the mating surfaces of member 113 and piston 112 are made spherical and smooth to provide liquid tight joints between valve 87, member 113 and piston 112.

For the purpose of illustration, passage 110 has been shown in Fig. 10 as being connected by a channel 115 to the rod end of a hydraulic motor M3 and to a control valve V6 which is connected to the head end of motor M3 by a channel 116 and to exhaust by a channel 117. When the plunger of valve V6 is in its neutral position as shown, liquid discharged by pump P4 will flow through channel 115, valve V6 and channel 117 to exhaust. When the plunger is shifted to one side or the other of its neutral position, liquid discharged by pump P4 will enter motor M3 and cause it to operate in one direction or the other.

Assuming that case 60 is completely filled with liquid and that valve V6 is as shown, the transmission will operate as follows:

When the pumps are started, pump P6 will supply liquid to pump P5 which will pump the liquid into case 60 as previously explained and as indicated by the full arrows in Fig. 10. The first liquid entering case 60 will flow (half arrows) through passage 77 into cylinder 76 and cause piston 75 to move slide block 67 toward its maximum displacement position against the resistance of springs 70 which will cause pump P5 to create a low pressure in case 60.

As soon as slide block 67 moves away from its zero displacement position, pump P4 will pump liquid from case 60 through channel 115 and valve V6 to exhaust and slide block 67 will continue to move until pump P4 is discharging liquid as fast as but no faster than pump P5 discharges liquid into case 60. At this time there will be no leakage out of pump P4 because it is not creating pressure.

When motor M3 is connected to a load and valve V6 is adjusted to direct liquid discharged by pump P4 into motor M3, pump P4 must create a pressure high enough to enable motor M3 to drive its load. This high pressure causes liquid to lead out of pump P4 into case 60 which in the prior transmission would cause motor M3 to slow down but in the present instance the first of the liquid leaking into case 60 will enter cylinder 76 and cause piston 75 to slightly increase the displacement of pump P4 until pump P4 is pumping all of the leakage liquid and all of the liquid delivered to it by pump P5. Consequently, the rate at which pump P4 delivers liquid to motor M3 is exactly equal to the rate at which pump P5 discharges liquid into case 60.

From the foregoing it will be obvious that in a transmission embodying the invention the speed of the motor will be determined by the displacement of the measuring pump and will remain constant at any given adjustment of the measuring pump.

The invention is not limited to the three forms of transmission illustrated and described herein but is susceptible of other modifications and adaptations without department from the scope of the invention which is hereby claimed as follows:

1. In a hydraulic transmission, the combination of a first pump for delivering liquid to an actuator to energize the same and having a liquid tight case and a displacement varying member arranged within said case, means urging said member toward its zero displacement position with a substantially constant force, a hydraulic servo-motor engaging said member for moving it toward its maximum displacement position, and a second pump driven in unison with said first pump and having its outlet communicating with the inlet of said first pump, said servo-motor and the interior of said case so that liquid discharged by said second pump will cause said servo-motor to move said member toward its maximum displacement position, said urging means will cause said second pump to maintain a low pressure in said case and to supercharge said first pump at that pressure, liquid leaking out of said first pump into said case will pass to the inlet of said first pump, and said first pump will discharge liquid at a pressure high enough to energize said actuator and at a rate equal to the rate at which said second pump discharges liquid.

2. In a hydraulic transmission, the combination of a first pump for delivering liquid to an actuator to energize the same and having a liquid tight case and a rotary pumping element and a displacement varying member arranged within said case, means urging said member toward its zero displacement position with a substantially constant force, a hydraulic servo-motor engaging said member for moving it toward its maximum displacement position, a second pump having a rotary pumping element fixed for rotation with the pumping element of said first pump, and means for varying the displacement of said second pump, said second pump having its outlet communicating with the inlet of said first pump, said servo-motor and the interior of said case, so that rotation of said pumping elements causes said second pump to deliver liquid to said first pump and liquid discharged by said second pump will cause said servo-motor to move said member toward its maximum displacement position, said urging means will cause said second pump to maintain a low pressure in said case and to supercharge said first pump at that pressure, liquid leaking out of said first pump into said case will pass to the inlet of said first pump, and said first pump will discharge liquid at a pressure high enough to energize said actuator and at a rate equal to the rate at which said second pump discharges liquid.

3. In a hydraulic transmission, the combination of a first pump for delivering liquid to an actuator to energize the same and having a liquid tight case and a displacement varying member arranged within said case, means urging said member toward its zero displacement position with a substantially constant force, a hydraulic servo-motor engaging said member for moving it toward its maximum displacement position, a second pump having its outlet connected solely to the inlet of said first pump and to said case and said servo-motor, and a prime mover connected to both of said pumps to drive the same in unison.

4. In a hydraulic transmission, the combination of a first pump for delivering liquid to an actuator to energize the same and having a liquid tight case and a displacement varying member arranged within said case, means urging said member toward its zero displacement position with a substantially constant force, a hydraulic servo-motor engaging said member for moving it toward its maximum displacement position, a second pump having means to vary its displacement, a prime mover connected to both of said pumps to drive the same in unison, a fluid channel connecting the outlet of said second pump to the inlet of said first pump and to said case and said servo-motor, channel means connecting the outlet of said first pump to said actuator and said actuator to the inlet of said second pump, and valve means arranged in said channel means to control the flow of liquid therethrough.

5. A hydraulic transmission, comprising a rotary hydraulic motor having a liquid tight case filled with liquid, a first pump connected to said motor for delivering liquid thereto to energize the same and having a liquid tight case filled with liquid and a displacement varying member arranged within said case, means urging said member toward its zero displacement position with a substantially constant force, a hydraulic servo-motor engaging said member for moving it toward its maximum displacement position, means connecting the interior of said motor case to said servo-motor and to the inlet of said pump, and a second pump driven in unison with said first pump and having its outlet communicating with the inlet of said first pump, said servo-motor and the interior of both of said cases so that liquid discharged by said second pump will cause said servo-motor to move said member toward its maximum displacement position, said urging means will cause said second pump to maintain a low pressure in both of said cases and to supercharge said first pump at that pressure, liquid leaking out of said first pump into its case will pass to the inlet of said first pump, liquid leaking out of said motor will flow to said servo-motor and to the inlet of said first pump and cause said servo-motor to shift said member just far enough to permit all of the liquid discharged by said second pump and all of said leakage liquid to pass through said first pump and thereby cause said motor to operate at a speed which remains constant at any given displacement of said second pump.

6. A hydraulic transmission, comprising a first pump having a liquid tight case filled with liquid and a displacement varying member arranged within said case, means urging said member toward its zero displacement position with a substantially constant force, a hydraulic servo-motor engaging said member for moving it toward its maximum displacement position, a second pump driven in unison with said first pump and having its outlet connected to the inlet of said first pump and to said case and said servo-motor, a rotary hydraulic motor connected to the outlet of said first pump and having a liquid tight case filled with liquid, and means connecting the interior of said motor case to the inlet of said first pump, to said servo-motor and to the outlet of said second pump.

7. A hydraulic transmission, comprising a first pump having a liquid tight case filled with liquid and a displacement varying member arranged within said case, means urging said member toward its zero displacement position with a substantially constant force, a hydraulic servo-motor engaging said member for moving it toward its maximum displacement position, a second pump driven in unison with said first pump and having its outlet connected to the inlet of said first pump and to said case and said servo-motor, a rotary hydraulic motor having a liquid tight case which is filled with liquid and is connected to the inlet of said first pump, to said servo-motor and to the outlet of said second pump, channel means connecting the outlet of said first pump to said motor and said motor to the inlet of said second pump, and valve means arranged in said channel means to control the flow of liquid therethrough.

8. In a hydraulic transmission, the combination of a liquid tight case, a first pump arranged within said case for delivering liquid to an actuator to energize the same and having a displacement varying member which is continuously urged toward its zero displacement position by a constant force, said pump having its inlet open to the interior of said case and its outlet extending through said case for connection to said actuator, a hydraulic servo-motor engaging said member for moving it toward its maximum displacement position, said servo-motor having its inlet opening into said case, a second pump arranged within said case and having its outlet opening into said case, means connected to the inlet of said second pump for supplying liquid thereto at a low pressure, and a shaft journaled in said case and connected to both of said pumps to drive the same and thereby cause said second pump to discharge liquid into said case at a low pressure and said liquid to cause said servo-motor to increase the displacement of said first pump until said first pump is discharging liquid at the same rate at which said second pump discharges liquid into said case and at a pressure high enough to energize said actuator.

9. In a hydraulic transmission, the combination of a liquid tight case, a first pump arranged within said case for delivering liquid to an actuator to energize the same and having a displacement varying member which is continuously urged toward its zero displacement position by a constant force, said pump having its inlet open to the interior of said case and its outlet extending through said case for connection to said actuator, a hydraulic servo-motor engaging said member for moving it toward its maximum displacement position, said servo-motor having its inlet opening into said case, a second pump arranged within said case and having its outlet opening into said case, and a third pump connected to the inlet of said second pump for supplying liquid thereto at a low pressure, a shaft journaled in said case and connected to all of said pumps to drive the same and thereby cause said third pump to supercharge said second pump, said second pump to discharge liquid into said case at a low pressure and said liquid to cause said servo-motor to increase the displacement of said first pump until said first pump is discharging liquid at the same rate at which said second pump discharges liquid into said case and at a pressure high enough to energize said actuator.

10. In a hydraulic transmission, the combination of a liquid tight case, a first pump arranged within said case for delivering liquid to an actuator to energize the same and having a displacement varying member which is continuously urged toward its zero displacement position by a constant force, said pump having its inlet open to the interior of said case and its outlet extending through said case for connection to said actuator, a hydraulic servo-motor engaging said member for moving it toward its maximum displacement position, said servo-motor having its inlet opening into said case, a second pump arranged within said case and having its outlet opening into said case and a displacement varying member which is continuously urged toward a minimum displacement position, a cylinder carried by said case, a piston fitted in said cylinder and engaging the displacement varying member of said second pump for moving it toward its maximum displacement position, a third pump connected to the inlet of said second pump for supplying liquid thereto at a low pressure, a shaft journaled in said case and connected to all of said pumps to drive the same and thereby cause said third pump to supercharge said second pump, said second pump to discharge liquid into said case at a low pressure and said liquid to cause said servo-motor to increase the displacement of said first pump until said first pump is discharging liquid at the same rate at which said second pump discharges liquid into said case and at a pressure high enough to energize said actuator, and means connecting said cylinder to said third pump including a valve operable to direct liquid from said third pump to said cylinder and cause said piston to increase the displacement of said second pump.

11. A pumping unit as set forth in claim 8 in which said second pump has pistons and cylinders arranged in a rotatable cylinder barrel and each cylinder communicates with a passage which extends through one end of said cylinder barrel, said case has a recess formed therein, a flat faced valve is fitted in said recess and engages said end of said cylinder barrel to connect each of said passages to said recess and to the interior of said case alternately during rotation of said cylinder barrel, and a passage extends from said recess to the exterior of said casing for connection to a source of low pressure liquid.

12. A pumping unit as set forth in claim 9 in which said third pump is a gear pump which is carried by said casing upon the outside thereof and has one of its gears fixed upon said shaft.

No references cited.